Feb. 4, 1947.  M. HASIMOTO  2,415,097
METHOD OF MANUFACTURING CLUTCH DISKS FOR AIRPLANES
Filed Sept. 28, 1940
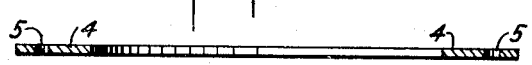
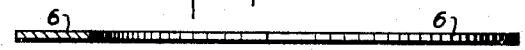
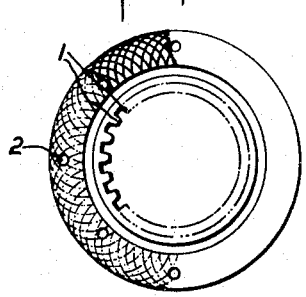
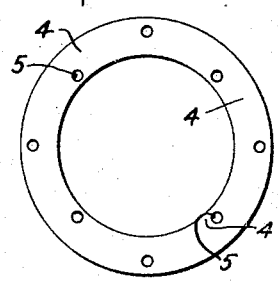
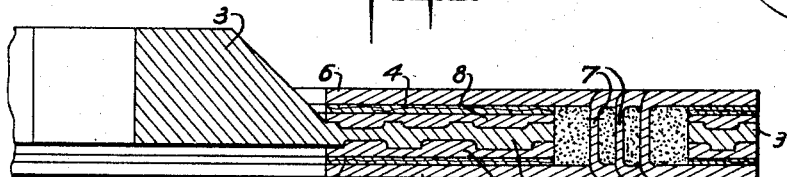
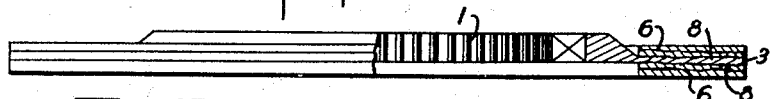
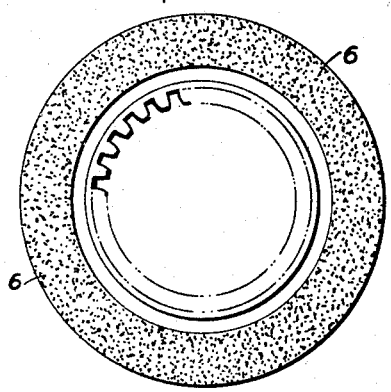
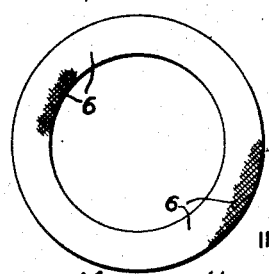
INVENTOR
MASAYOSI HASIMOTO
BY
ATTORNEY Patented Feb. 4, 1947

2,415,097

UNITED STATES PATENT OFFICE 2,415,097

METHOD OF MANUFACTURING CLUTCH DISCS FOR AIRPLANES

Masayosi Hasimoto, Azabu-ku, Tokyo, Japan; vested in the Alien Property Custodian Application September 28, 1940, Serial No. 358,825
In Japan October 10, 1939

2 Claims. (Cl. 154—81)

This invention relates to a method of manufacturing clutch discs for airplanes. The method of manufacturing the clutch disc is as follows: First corrode both surfaces of a steel clutch plate with a suitable chemical and then drill holes through it. Next, coat it with phthalic anhydride resin. Between the friction plate made of asbestos cloth which is impregnated with phenolic resin having caustic soda as its catalyzer and the clutch plate which is coated with phthalic anhydride resin, insert an adhesive layer consisting of a sheet of asbestos paper which is impregnated with phenolic resin having ammonia as its catalyzer. The friction plate, the asbestos paper, and the clutch plate are then tightly bound together by means of a piece of asbestos string, and heated and compressed in a mould of suitable shape so as to have the friction plate adhered firmly on the clutch plate.

The main object of this invention is to produce a clutch disc suitable for use in clutching on or off the shaft of an engine which is rotating at an extremely high speed, within oil or in a very small space such as in airplanes.

The accompanying drawing shows an example of applications of this invention:

Fig. 1 is an edge view partly in section of the clutch plate.

Fig. 2 shows a plan view of the same.

Fig. 3 shows an edge of the adhesive layer.

Fig. 4 shows a plan view of the same.

Fig. 5 is an edge view of the friction plate.

Fig. 6 shows a plan view of the same.

Fig. 7 is a sectional view through the parts of the clutch disc, with such parts separated.

Fig. 8 is a fragmentary sectional view through the completed clutch disc constructed in accordance with this invention.

Fig. 9 is an edge view with parts in section of the completed clutch disc constructed in accordance with this invention.

Fig. 10 shows a plan view of the same.

The main advantage of this invention is the manufacture of a clutch disc for use in airplanes which is capable of being used for heavy loads, at high speed, and within a very small space.

One example of applications of this invention is shown in the accompanying diagrams:

First, both surfaces and sides of the steel clutch plate 3 are corroded with a suitable chemical and holes 2 are drilled through it. Second, the adhesive layer 4 is obtained by impregnating a sheet of soft asbestos paper with phenolic resin having ammonia as its catalyzer and holes 5 are drilled through it. Third, the friction plate 6 is obtained by impregnating a circular asbestos cloth of uniform cross-section with phenolic resin having caustic soda as its catalyzer. Fourth, phthalic anhydride resin is coated on the corroded parts of the clutch plate 3 on both surfaces, and the adhesive layer 4 and the friction plate 6 are placed on each surface of the clutch plate. The clutch plate 3, the adhesive layer 4, and the friction plate 6 are then bound tightly together by means of pieces of asbestos string threaded through holes 2 and 5. Fifth, the clutch disc thus assembled is placed in a mould of proper shape and heated at a temperature of 180 degrees centrigrade and compressed at a pressure of 5 tons per square inch for 2 minutes so as to adhere the friction plates 6 on the clutch plate. Finally the surface of the friction plates on both sides of the clutch plate are ground smooth by means of a grinder in order to obtain a finished product of clutch discs.

The phenolic resin having caustic soda as its catalyzer possesses a proper degree of hardness but lacks adhesiveness, while the phenolic resin having ammonia as its catalyzer possesses a high degree of adhesiveness but lacks adhesiveness against metal since it becomes impregnated with oil when heated within oil, though no variation is noticed in resin oil. The phthalic anhydride resin possesses adhesiveness and the degree of adhesiveness does not change when heated within oil since the oil does not impregnate the resin.

Because of the above-mentioned construction, a clutch disc manufactured in accordance with the invention has high friction qualities, will withstand high temperatures in oil, and will operate efficiently under heavy loads at high speed and there is no danger of the friction discs coming apart from the clutch plate.

Having now particularly described and ascertained the nature of my said invention and in what manner the same is to be performed, I declare that what I claim is:

1. The herein described method of forming a clutch disc, the steps of which consist, in roughening the faces of a steel plate, coating said surfaces with phthalic anhydride resin, then forming sheets of soft asbestos paper impregnated with phenolic resin having ammonia as its catalyzer, and applying the sheets to the coated surfaces of the plate, then providing friction plates of asbestos cloth impregnated with phenolic resin having caustic soda as its catalyzer and placing the friction plates over the sheets, then fastening the parts together and finally subjecting the parts to heat and pressure to cause the parts to adhere.

2. A laminated composite molded clutch disc comprising a roughened metal plate, an asbestos friction plate impregnated with phenolic resin having caustic soda as its catalyzer, and layers of phthalic anhydride resin and of asbestos impregnated with phenolic resin having ammonia as its catalyzer securely uniting said plates, said intermediate phthalic anhydride and ammonia catalyzed phenolic resin layers respectively disposed adjacent the metal and friction plates.

MASAYOSI HASIMOTO.

REFERENCES CITED

The following references are of record in the file of this patent:

UNITED STATES PATENTS

| Number | Name | Date |
|---|---|---|
| 1,673,239 | Groff | June 12, 1928 |
| 2,087,453 | Steder | July 20, 1937 |
| 2,059,576 | Glick | Nov. 3, 1936 |
| 1,844,512 | Mains | Feb. 9, 1932 |
| 2,149,732 | Groff | Mar. 7, 1939 |